US010962936B2

(12) United States Patent
Lim et al.

(10) Patent No.: US 10,962,936 B2
(45) Date of Patent: Mar. 30, 2021

(54) METHOD AND DEVICE FOR POST-CORRECTION OF PREDICTED PARAMETERS BY USING A H-INFINITY FILTER

(71) Applicant: INDUSTRY-UNIVERSITY COOPERATION FOUNDATION SOGANG UNIVERSITY, Seoul (KR)

(72) Inventors: Jaechan Lim, Busan (KR); Hyung Min Park, Seoul (KR)

(73) Assignee: INDUSTRY-UNIVERSITY COOPERATION FOUNDATION SOGANG UNIVERSITY, Seoul (KR)

( * ) Notice: Subject to any disclaimer, the term of this patent is extended or adjusted under 35 U.S.C. 154(b) by 301 days.

(21) Appl. No.: 16/127,674

(22) Filed: Sep. 11, 2018

(65) Prior Publication Data
US 2019/0079466 A1   Mar. 14, 2019

(30) Foreign Application Priority Data
Sep. 12, 2017  (KR) ........................ 10-2017-0116368

(51) Int. Cl.
| G05B 13/02 | (2006.01) |
| G01W 1/18 | (2006.01) |
| G06F 17/11 | (2006.01) |
| G06F 17/16 | (2006.01) |
| G01W 1/10 | (2006.01) |

(52) U.S. Cl.
CPC .............. *G05B 13/021* (2013.01); *G01W 1/10* (2013.01); *G01W 1/18* (2013.01); *G06F 17/11* (2013.01); *G06F 17/16* (2013.01); *G01W 2201/00* (2013.01)

(58) Field of Classification Search
CPC ..... G05B 13/0218; G05B 13/04; G01W 1/18; G01W 1/10; G01W 2201/00; G06F 17/11; G06F 17/16
See application file for complete search history.

(56) References Cited

U.S. PATENT DOCUMENTS

2003/0166407 A1* 9/2003 Qian ................... H04W 52/226
  455/522
2012/0296471 A1* 11/2012 Inaba ....................... B25J 9/163
  700/253

(Continued)

FOREIGN PATENT DOCUMENTS

| KR | 101035398 | 5/2011 |
| KR | 101092380 | 12/2011 |
| KR | 101179590 | 9/2012 |

*Primary Examiner* — Mohammad K Islam
(74) *Attorney, Agent, or Firm* — Cantor Colburn LLP

(57) ABSTRACT

Provided are a prediction value correction method and apparatus. The prediction value correction method includes steps of: (a) determining a prediction condition to be predicted; (b) receiving past prediction values and past measurement values according to the determined prediction condition; (c) filtering the past prediction values and the past measurement values by using an H-infinity filter to obtain an output value for a final time point; (d) estimating a future bias for a date and time point to be predicted by using the output value of the H-infinity filter; and (e) correcting a future prediction value for the date and time point to be predicted by using the estimated future bias to obtain a corrected future prediction value for the date and time point to be predicted.

3 Claims, 7 Drawing Sheets

(56) References Cited

U.S. PATENT DOCUMENTS

| | | | |
|---|---|---|---|
| 2013/0300377 A1* | 11/2013 | Mao | B60L 50/16 |
| | | | 320/152 |
| 2014/0376794 A1* | 12/2014 | Dumoulin | G01R 33/5611 |
| | | | 382/131 |
| 2015/0274328 A1* | 10/2015 | Wallner | B64G 1/242 |
| | | | 701/519 |
| 2015/0308827 A1* | 10/2015 | Fujii | B60W 40/112 |
| | | | 702/151 |
| 2018/0128625 A1* | 5/2018 | Kwon | G05D 1/0094 |
| 2018/0180442 A1* | 6/2018 | Uchida | G01P 21/02 |
| 2018/0204074 A1* | 7/2018 | Kumano | G06T 7/12 |
| 2018/0220937 A1* | 8/2018 | Mizuochi | A61B 5/7278 |

\* cited by examiner

FIG. 7

| Location | Hran | K | n | RMSE | RMSE gain | Mean bias | Maximum bias |
|---|---|---|---|---|---|---|---|
| Chun-cheon | 24h | 30 | 1 | K: 0.1624 | K: 0.1466 9.76% | K: 0.1140 | K: 0.0966 | K: 0.4606 | K: 0.4218 |
| | | 30 | 2 | K: 0.1624 | K: 0.1456 10.37% | K: 0.1143 | K: 0.0963 | K: 0.4606 | K: 0.4340 |
| | | 30 | 1 | H: 0.1624 | H: 0.1398 13.92% | H: 0.1140 | H: 0.0947 | H: 0.4606 | H: 0.4104 |
| | | 30 | 2 | H: 0.1624 | H: 0.1399 13.83% | H: 0.1143 | H: 0.0946 | H: 0.4606 | H: 0.4113 |
| | 1h | 30 | 1 | K: 0.1368 | K: 0.1194 12.70% | K: 0.0988 | K: 0.0793 | K: 0.4214 | K: 0.0989 |
| | | 30 | 2 | K: 0.1368 | K: 0.1186 13.32% | K: 0.0988 | K: 0.0753 | K: 0.4214 | K: 0.3973 |
| | | 30 | 1 | H: 0.1368 | H: 0.1161 15.15% | H: 0.0988 | H: 0.0760 | H: 0.4214 | H: 0.3716 |
| | | 30 | 2 | H: 0.1368 | H: 0.1154 15.66% | H: 0.0988 | H: 0.0759 | H: 0.4214 | H: 0.3689 |

METHOD AND DEVICE FOR POST-CORRECTION OF PREDICTED PARAMETERS BY USING A H-INFINITY FILTER

CROSS-REFERENCE TO RELATED APPLICATIONS

This application is based upon and claims the benefit of priority from Korean Patent Application No. 10-2017-0116368, filed on Sep. 12, 2017 to the Korean Intellectual Property Office, the entire contents of which is incorporated herein by reference.

BACKGROUND OF THE INVENTION

1. Field of the Invention

The present invention relates to a prediction value correction method for a certain physical quantity and a prediction value correction apparatus for a certain physical quantity, and more particularly, to a method of correcting a prediction value of a certain physical quantity by using a post-processing method which does not require statistical information of noise by using an H-infinity filter and an apparatus for correcting a prediction value of a certain physical quantity using the method.

2. Description of the Related Art

A case where a certain prediction value is weather prediction (forecast) will be described. Renewable energy such as solar energy is an important factor in a smart grid system. Therefore, prediction of a power generation amount and a demand amount is an influential factor in management of an independent grid system.

Numerical Weather Prediction (NWP) is a scientific method of predicting future atmospheric conditions by solving physical equations representing temporal changes of weather elements such as wind and temperature with a supercomputer. In this method, for easy calculation by a computer, the Earth is divided into detailed grids, and the atmospheric states are represented by values at the grid points. Objective analysis is performed by obtaining current values at the grid points on the basis of various observation data from all over the Earth. By using results of the objective analysis as initial values, future atmospheric states are calculated and predicted by a numerical forecasting model.

Since solar power generation is closely related to solar radiation, the prediction of the value thereof is directly related to the predict ion of the solar power generation. There are various methods for accurate prediction of the solar power generation. One of the methods is a post-processing method.

The post-processing method is a method of estimating correlation between past prediction values and measurement values by NWP and reflecting the correlation to more accurate future prediction values.

The post-processing methods include a spatial averaging method and a bias removing method. Among the post-processing method, the bias removing method has many advantages and high accuracy. In the related art, a bias is modeled as a linear polynomial, and the relationship can be found by learning with given data. Herein, the bias means a difference value between a past prediction value and a past measurement value by an existing prediction method.

However, there is a limit to models that depend on existing statistical information in order to more precisely model the future bias by using the past prediction values and the past measurement values. In addition, the future bias can be more precisely estimated by a method based on real environment without depending on the statistical information. Therefore, the present invention proposes a method of learning bias, which is modeled so as not to depend on the statistical information, by using given past data, obtaining a converging value, and applying the value to a future prediction value to acquire a more precise prediction value. Although the present invention has been described in connection with the weather prediction, the present invention can be applied to prediction of all physical quantities varying in time and space, such as stock price prediction, demand prediction, and power generation amount prediction.

SUMMARY OF THE INVENTION

In order to solve the above-mentioned problems, the present invention is to provide a prediction value correction method capable of providing a precise prediction value of a physical quantity by estimating a future bias from past prediction values and past measurement values by using an H-infinity filter, and correcting a future prediction value by using the estimated future bias.

The present invention is also to provide a prediction value correction apparatus of a specific physical quantity implemented using a method of estimating a future bias of a prediction value of a certain physical quantity and correcting a prediction value of a future physical quantity by using the prediction value.

According to an aspect of the present invention, there is provided a prediction value correction method including steps of: (a) determining a prediction condition to be predicted; (b) receiving past prediction values and past measurement values according to the determined prediction condition; (c) filtering the past prediction values and the past measurement values by using an H-infinity filter to obtain an output value for a final time point; (d) estimating a future bias for a date and time point to be predicted by using the output value of the H-infinity filter; and (e) correcting a future prediction value for the date and time point to be predicted by using the estimated future bias to obtain a corrected future prediction value for the date and time point to be predicted.

In the prediction value correction method according to the first aspect, it is preferable that the prediction condition in the step (a) includes the date to be predicted, a prediction time, a time point, a filter order, and a window size.

In the prediction value correction method according to the first aspect, it is preferable that the step (c) includes the steps of: (c1) providing the past prediction values and the past measurement values to the H-infinity filter; (c2) initializing variables of the H-infinity filter; (c3) estimating a filter gain by using the initialized H-infinity filter, updating the estimated filter gain, obtaining an error covariance, and performing a filtering process; and (c4) performing sequentially a time series of processes to obtain the output value for the final time point which is an end of a window.

In the prediction value correction method according to the first aspect, it is preferable that the corrected future prediction value for the corresponding time point of each date is sequentially obtained by repeatedly performing the steps (c), (d), and (e) while incrementing a data corresponding to a window by one.

According to a second aspect of the present invention, there is provided a prediction value correction apparatus including: a past prediction value providing module which provides past prediction values in accordance with a prediction condition to be predicted; a past measurement value providing module which provides past measurement values in accordance with the prediction condition to be predicted; an H-infinity filter which receives the past prediction values and the past measurement values from the past prediction value providing module and the past measurement value providing module, performs an H-infinity filtering process, and provides an output value for a final time point; a future bias estimation module which estimates a future bias for a date and time point to be predicted by using the output value of the H-infinity filter; and a future prediction value correction module which corrects a future prediction value for the date and time point to be predicted by using the estimated future bias to obtain a corrected future prediction value for the date and time point to be predicted.

In the prediction value correction apparatus according to the second aspect, it is preferable that the prediction condition includes the date to be predicted, a prediction time, a time point, a filter order, and a window size.

In the prediction value correction apparatus according to the second aspect, it is preferable that the H-infinity filter receives the past prediction values and the past measurement values, initializes variables of the H-infinity filter, estimates a filter gain, updates the measurement values, obtains an error covariance, performs a filtering process, and obtains the output value for the final time point which is an end of a window.

BRIEF DESCRIPTION OF THE DRAWINGS

FIG. 7 is a table listing performance comparison of the case of correcting the weather prediction value by the NWP system in the related art, the case of correcting the weather prediction value by using the Kalman filter in the related art, and the case of correcting the weather prediction value by using the H-infinity filter according to the present invention.

DETAILED DESCRIPTION OF THE PREFERRED EMBODIMENTS

A prediction value correction method for a certain physical quantity according to the present invention is characterized in that a precise future prediction value can be obtained by applying an H-infinity filter to past prediction values and measurement values to obtain an output value of a final time point, estimating a future bias for a data and time point to be predicted by using the output value, and correcting a future prediction value predicted by a prediction system (for example, NWP) by using the estimated future bias.

Hereinafter, a prediction value correction method and a prediction value correction apparatus using the same according to a preferred embodiment of the present invention will be described in detail with reference to the accompanying drawings.

Figure 1:
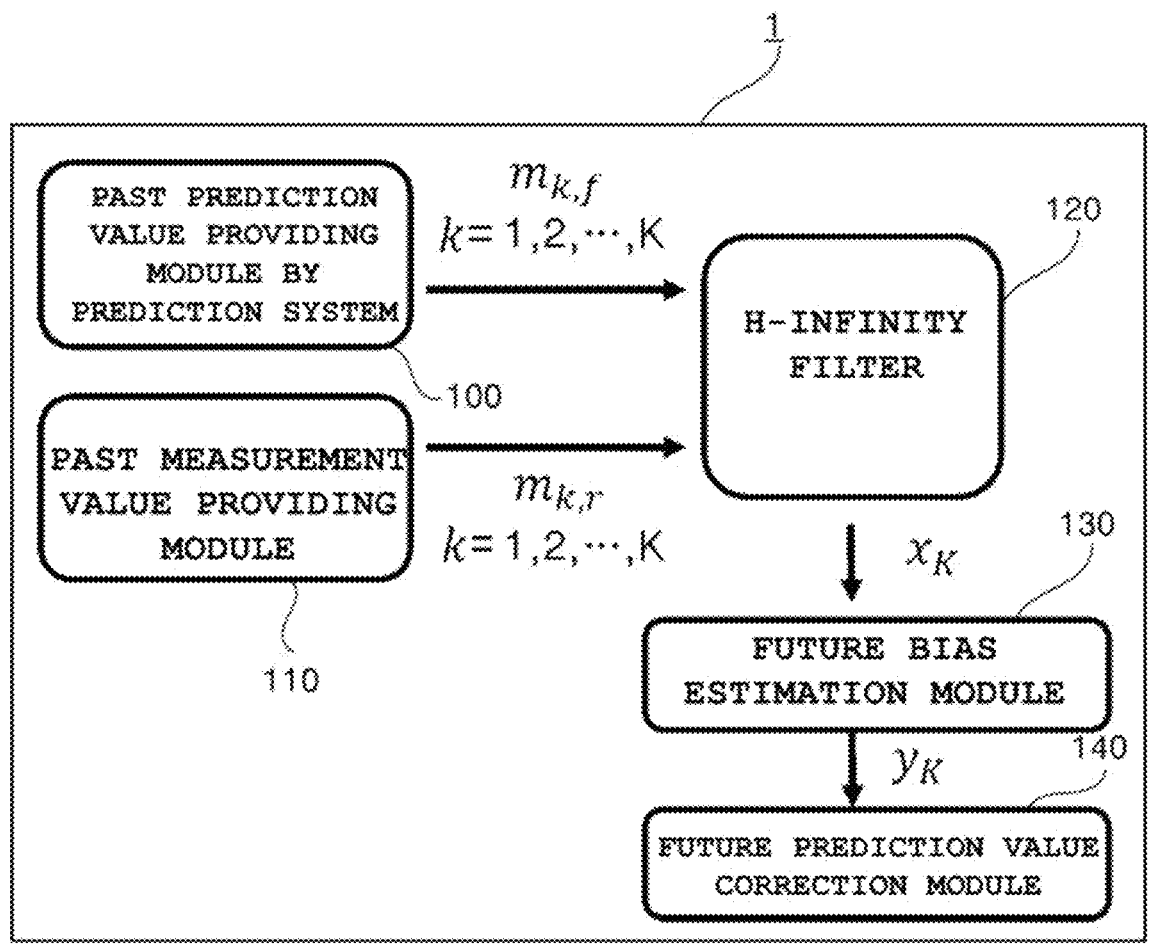
FIG. 1 is a block diagram illustrating a prediction value correction apparatus 1 according to a preferred embodiment of the present invention.

FIG. 1 is a block diagram illustrating a prediction value correction apparatus 1 according to a preferred embodiment of the present invention.

Referring to FIG. 1, the prediction value correction apparatus 1 according to the present invention includes a past prediction value providing module 100, a past measurement value providing module 110, an H-infinity filter 120, a future bias estimation module 130, and a future prediction value correction module 140.

The past prediction value providing module 100 provides the past prediction value in accordance with the prediction condition to be predicted to the H-infinity filter 120. The past measurement value providing module 110 provides the past measurement value actually measured corresponding to the prediction value. The prediction condition may include a date to be predicted, a prediction time, a time point, a filter order, and a window size.

The H-infinity filter 120 receives the past prediction values and past measurement values from the past prediction value providing module and the past measurement value providing module, initializes variables of the H-infinity filter, estimates a filter gain, updates an estimated measurement value, obtains an error covariance, performs a filtering process, and obtains and provides an output value for the final time point which is an end of a window.

The future bias estimation module 130 estimates a future bias for the date and time point to be predicted by using the output value for the final time point provided from the H-infinity filter.

The future prediction value correction module 140 corrects the future prediction value predicted by the NWP system for the date and time point to be predicted by using the estimated future bias and obtains and provides a future prediction value for the date and time point to be predicted.

Figure 2:
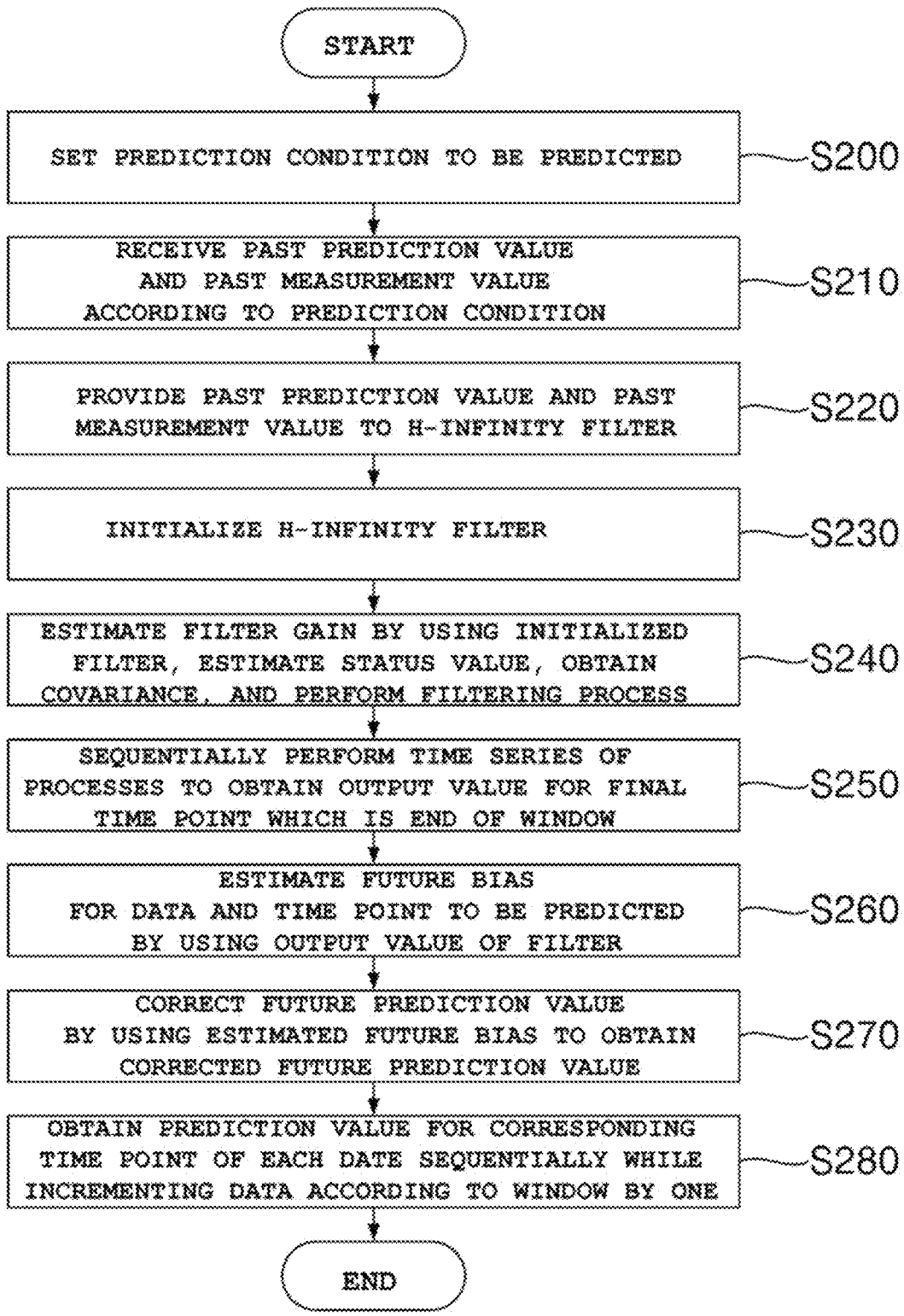
FIG. 2 is a flowchart sequentially illustrating a prediction value correction method applied to the prediction value correction apparatus according to the preferred embodiment of the present invention.

Hereinafter, a prediction value correction method applied to the prediction value correction apparatus described above will be described in more detail with reference to FIG. 2. FIG. 2 is a flowchart sequentially illustrating the prediction value correction method applied to the prediction value correction apparatus according to the preferred embodiment of the present invention.

Referring to FIG. 2, first, the prediction value correction method according to the present invention determines a prediction condition to be predicted (step S200). The prediction condition may include a date to be predicted, a prediction time, a time point, a filter order, and a window size.

Next, past prediction values $m_{k,f}$ and past measurement values $m_{k,r}$ in accordance with the determined prediction conditions are provided (step S210). Herein, the past prediction values $m_{k,f}$ are prediction values obtained by the prediction system (for example, NWP) for each specific date and time point, k denotes a discontinuous time, and f denotes a prediction value (forecast). Any desired number of k's many be used. For example, a case where the number of k's is K may be assumed, and thus k=1, 2, . . . , K. Herein, the past measurement values $m_{k,r}$ are observation values actually measured for a date and time point corresponding to the past prediction values, and r denotes a measurement value.

An actual bias $B_k$ for an arbitrary time is defined by Mathematical Formula 1.

$$B_k = m_{k,f} - m_{k,r}, k=1, \ldots, K \qquad \text{[Mathematical Formula 1]}$$

The above-mentioned bias can be expressed as Mathematical Formula 2 by modeling the prediction value $m_{k,f}$ by using an n-order linear polynomial equation.

$$y_k = x_{k,0} + x_{k,1} \cdot m_{k,f}^1 + x_{k,2} \cdot m_{k,f}^2 + \ldots + x_{k,n} \cdot m_{k,f}^n + w_k \qquad \text{[Mathematical Formula 2]}$$

Herein, $w_k$ denotes a noise component. Mathematical Formula 2 is expressed again by using a column vector as expressed by Mathematical Formulas 3 to 5.

$$x_k = [x_{k,0} x_{k,1} x_{k,2} x_{k,3} \ldots x_{k,n}]^T \qquad \text{[Mathematical Formula 3]}$$

$$y_k = G_k x_k + w_k \qquad \text{[Mathematical Formula 4]}$$

$$G_k = [1\, m_{k,f}^1\, m_{k,f}^2 \ldots m_{k,f}^n] \qquad \text{[Mathematical Formula 5]}$$

Herein, $x_k$ needs to be obtained. $x_k$ is defined as a vector including (n+1) elements, and T denotes transposition. Through this process, an H-infinity filtering process is performed. In the related art, a Kalman filter is used. However, in the present invention, an H-infinity filter is used to estimate the future bias of the prediction value and the measurement value by the prediction system.

The H-infinity filter and the Kalman filter are filters that estimate some time-varying values by a few simple steps according to time while repeatedly incrementing k. The predictive correction is used for continuously estimating the time-varying $x_k$ values and use that last estimated value to estimate the error (that is, bias) for the prediction value of the next day of the last day. At this time, the specific time point and the length of the prediction time are determined in advance, and necessary data corresponding thereto are collected. The time point is one of 24 hours a day, and the length of the prediction time is 0 to 48 hours. For example, if the window size K=30 is used and the physical quantity at 10:00 am on May 1 is desired to be predicted before 1 hour, the prediction values of the physical quantity by the past prediction system at 10:00 am from April 1 to April 30 and the corresponding actual observation values are required. K can have a variety of values from 30 to 90, depending on the location where prediction is desired.

Since the Kalman filter requires specific numerical insertion of $u_k$, $w_k$, means, and variance values of noise, the program execution time becomes very long. However, since the H-infinity filter does not require a specific numerical insertion, there are advantages in that the filtering process becomes simple, and the program execution time becomes short.

Next, the past prediction values and past measurement values are provided to the H-infinity filter (step S220).

Next, variables of the H-infinity filter are initialized (step S230). The H-infinity filter initially has parameters which are required to set some initial values for the initialization. That is, if 0 as an initial value of $x_0$ is inserted, each variable is set to an initial value larger than 0, as illustrated in Mathematical Formula 6.

$$0 < \gamma$$
$$0 < P_0$$
$$0 < V$$
$$0 < W \qquad \text{[Mathematical Formula 6]}$$

Herein, $\gamma$ is bound, $P_0$ is a weighted value for error of the estimated value of the initial value, and V and W are weighted values of noise.

The subsequent processes take place recursively with time.

The risk function J in the H-infinity filter is defined as Mathematical Formula 7.

$$J = \frac{\sum_{k=0}^{K} \|x_k - \hat{x}_k\|_{x_k}^2}{\|x_0 - \hat{x}_0\|_{v^{-1}}^2 + P_0} \qquad \text{[Mathematical Formula 7]}$$

$$\sum_{k=0}^{K} \left( \|u_k\|_{W_k^{-1}}^2 + \|w_k\|_{V_k^{-1}}^2 \right)$$

Herein, $X_k$, $\dot{P}_k$, $W_k$ and $V_k$ is a weighting matrices, $\|\bullet\|$ is the vector norm, and $\|u_k\|_{W_k^{-1}}^2$ denotes $u_k^T W^{-1 u_k}$.

The maximal J is minimized by the bound as illustrated in Mathematical Formula 8.

$$\sup J < \gamma^{-1} \qquad \text{[Mathematical Formula 8]}$$

Herein, sup denotes supremum.

J' is defined as Mathematical Formula 9.

$$J' = \qquad \text{[Mathematical Formula 9]}$$
$$-\gamma^{-1} \|x_0 - \hat{x}_0\|_{P_0}^2 + \sum_{k=0}^{K} \left[ \|x_k - \hat{x}_k\|_{x_k}^2 - \gamma^{-1} \left( \|u_k\|_{W_k^{-1}}^2 + \|w_k\|_{V_k^{-1}}^2 \right) \right]$$

This problem becomes a minimax problem of Mathematical Formula 10.

$$\min_{\hat{x}_k} \max_{(u_k, w_k, x_0)} J' \qquad \text{[Mathematical Formula 10]}$$

Next, the filter gain $H_k$ is estimated by using the initialized H-infinity filter, the estimated measurement value $x_k$ is updated, the error covariance $P_k$ is obtained, and the filtering process is performed (step S240). Step 240 will be described in more detail.

The H-infinity gain ($H_k$) is obtained by the following Mathematical Formula 11.

$$H_k = F P_{k-1} S_k (G_k)^T V_k^{-1} \qquad \text{[Mathematical Formula 11]}$$

Herein, $S_k$ can be obtained by the Mathematical Formula 12.

$$S_k = \{I - \gamma x_k P_{k-1} + (G_k)^T V_k^{-1} G_k P_{k-1}\}^{-1} \qquad \text{[Mathematical Formula 12]}$$

By using the above obtained values, the state value ($x_k$) can be estimated by Mathematical Formula 13.

$$x_k = F x_{k-1} + H_k (y_k - G_k x_{k-1}) \qquad \text{[Mathematical Formula 13]}$$

At the last step in one regression, the error covariance $P_k$ is updated by using Mathematical Formula 14.

$$P_k = F P_{k-1} S_k F^T + W_k \qquad \text{[Mathematical Formula 14]}$$

Next, a time series of processes is sequentially performed to obtain an output value $x_K$ for the final time point, which is an end of a window (step $250).

Next, by using the output value $x_K$ of the H-infinity filter, a future bias for the date and timepoint to be predicted is estimated (step S260). The future bias $y_k$ is estimated by the following Mathematical Formula 15.

$$y_K = G_K x_K \quad \text{[Mathematical Formula 15]}$$

Next, by using the estimated future bias, a future prediction value $m_{K+1,f}$ for the date and time point to be predicted is corrected, and the corrected future prediction value $m'_{K+1,f}$ for the date and time point to be predicted is obtained as expressed by Mathematical Formula 16 (step S270).

$$m'_{K+1,f} = m_{K+1,f} - y_k \quad \text{[Mathematical Formula 16]}$$

In the prediction value correction method, the steps 220 to 270 are repeatedly performed recursively while incrementing a data corresponding to a window by one to sequentially obtain the corrected future prediction value for a corresponding time point of each date.

FIGS. 3 to 6 are diagrams illustrating weather prediction as examples, which are graphs of performance comparison of a case of a weather prediction value by a NWP system in the related art, a case of correcting a weather prediction value by using a Kalman filter in the related art, and a case of correcting a weather prediction value by using an H-infinity filter according to the present invention.

Figure 3:
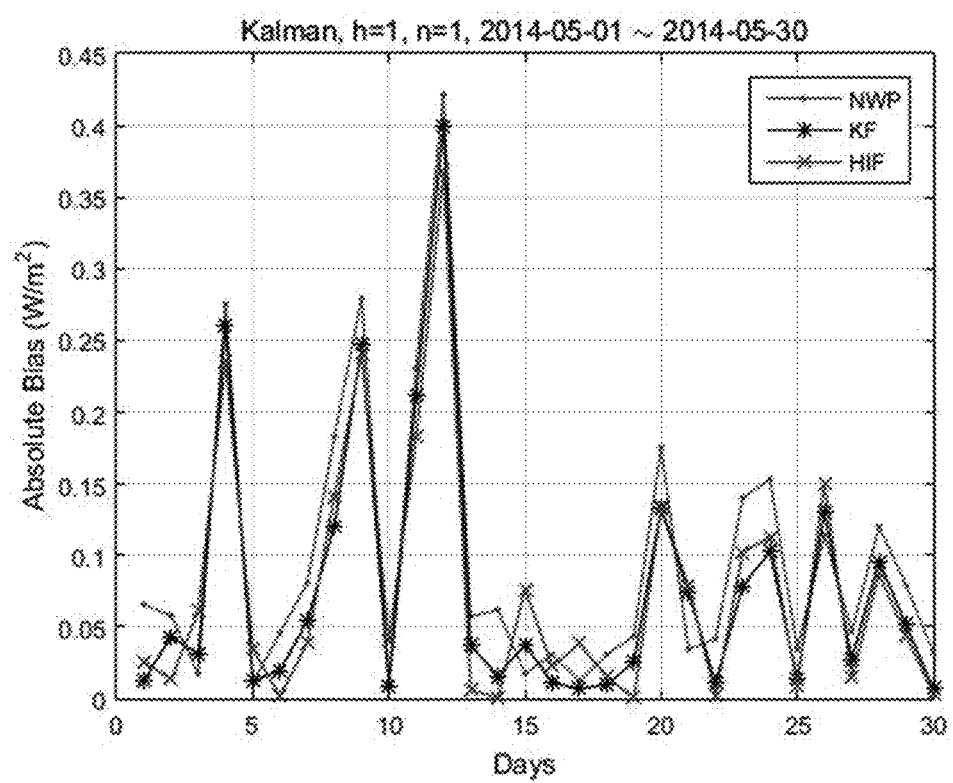
FIGS. 3 to 6 are diagrams illustrating weather prediction as examples, which are graphs of performance comparison of a case of a weather prediction value by a NWP system in the related art, a case of correcting a weather prediction value by using a Kalman filter in the related art, and a case of correcting a weather prediction value by using an H-infinity filter according to the present invention.
Figure 4:
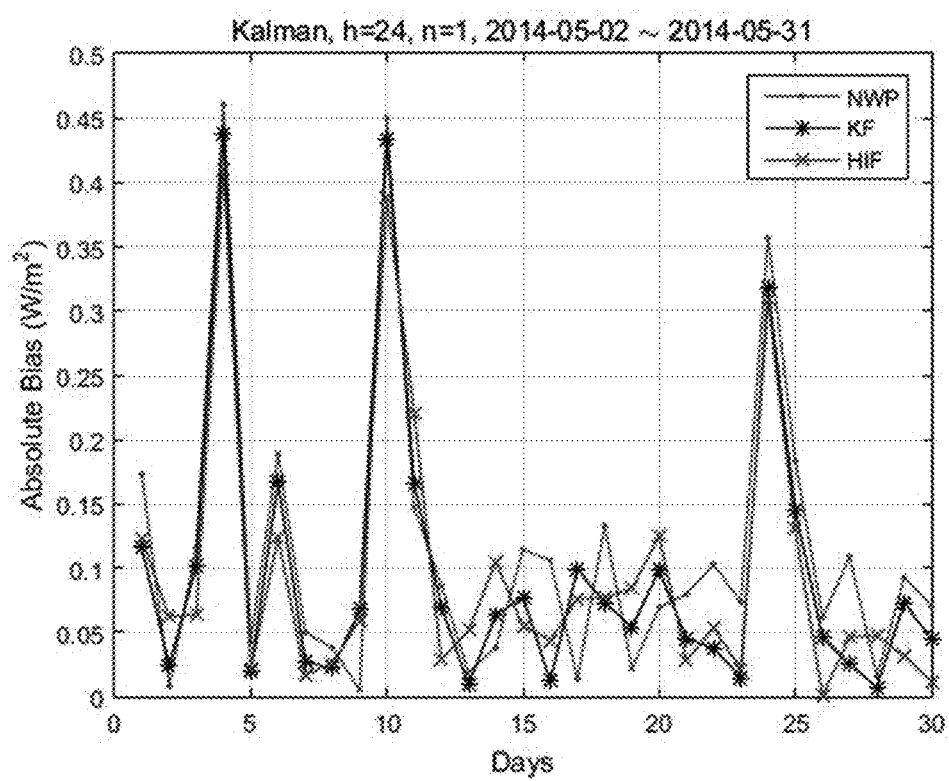
Figure 5:
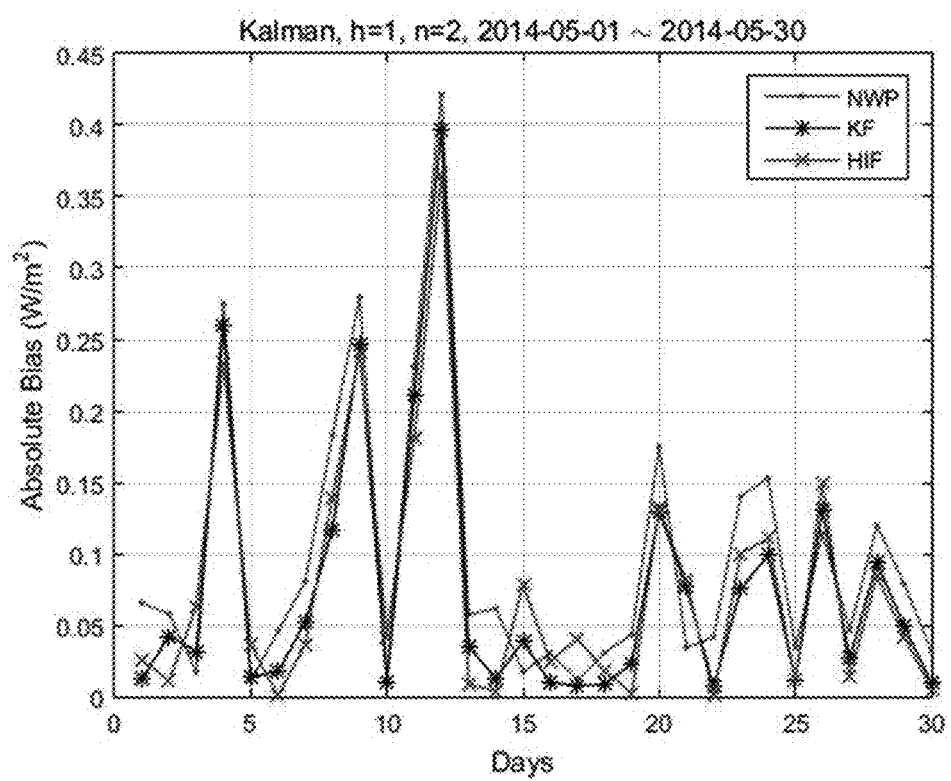
Figure 6:
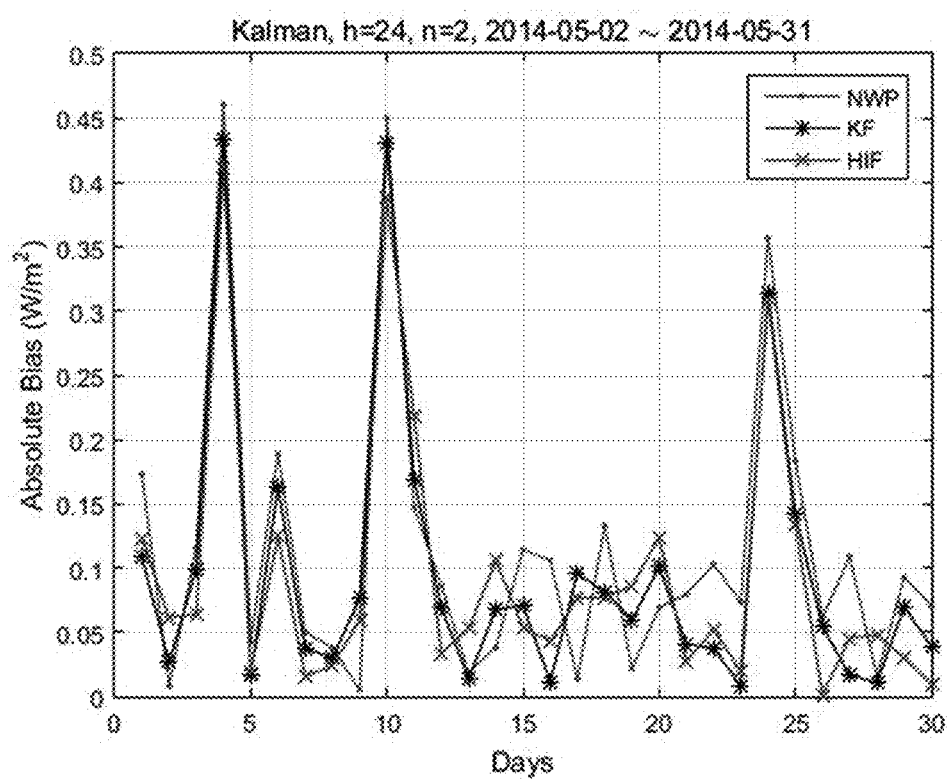

FIG. 3 illustrates a case of 1-hour prediction (h=1), 10:00 am, n=1 in Chuncheon area from 2014 May 1 to 2014 May 30, a case of 24-hour prediction (h=24), 3:00 am, n=1 in Chuncheon area during the period from 2014 May 2 to 2014 May 31, a case of 1-hour prediction (h=1), 10:00 am, n=2 in Chuncheon area from 2014 May 1 to 2014 May 30, a case of 24-hour prediction (h 5=24), 3:00 am, n=2 in Chuncheon area during the period from 2014 May 2 to 2014 May 31.

FIG. 7 is a table listing performance comparison of the case of correcting the weather prediction value by the NWP system in the related art, the case of correcting the weather prediction value by using the Kalman filter in the related art, and the case of correcting the weather prediction value by using the H-infinity filter according to the present invention.

In FIG. 7, K denotes a window size, n denotes a polynomial order, Hrzn denotes the prediction time, and the root mean square error (RMSE) denotes a square root of a mean value of squares of biases for prediction values. The RMSE gain is a reduction ratio of the RMSE of the Kalman filter (Kf) and the H-infinity filter (Hf) on the basis on the RMSE of the NWP. The mean bias denotes a mean value of the biases for the weather prediction values included in the window, and the maximum bias denotes the maximum value of the bias due to the weather prediction values included in the window. In addition, N denotes the NWP system, Kf denotes the Kalman filter, and Hf denotes the H-infinity filter.

Referring to FIG. 7, the RMSE of the NWP is 0.1624, the RMSE of Kf is 0.1466, the RMSE gain of Kf is 9.76%, the RMSE of Hf is 0.1398, and the RMSE gain of Hf is 13.92%. Therefore, it can be understood that the RMSE gain is improved in the case of using the H-infinity filter according to the present invention. It can also be understood that the mean bias is also improved in the case of using the H-infinity filter according to the present invention. In addition, with respect to the maximum bias, since the NWP is 0.4606 and Hf of 0.4104 is a small value in comparison with the Kf of 0.6218, it can be understood that the system according to the present invention has superior performance. This is because there is a great significance in lowering the error of the maximum value among the errors for the 30 prediction values.

The prediction value correction method and apparatus according to the present invention can be used in weather prediction, stock price prediction, demand prediction, power generation amount prediction, and the like.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

What is claimed is:

1. A prediction value correction method executed by a computer processor of a weather prediction system, the method comprising steps of:
   (a) determining a prediction condition to be predicted;
   (b) receiving past prediction values and past measurement values according to the determined prediction condition;
   (c) filtering the past prediction values and the past measurement values by using an H-infinity filter to obtain an output value $x_K$ for a final time point and outputting the output value;
   (d) estimating a future bias for a date and time point to be predicted by using the output value of the H-infinity filter; and
   (e) correcting a future prediction value for the date and time point to be predicted by using the estimated future bias to obtain a corrected future prediction value for the date and time point to be predicted,
   wherein the step (c) includes steps of:
   (c1) providing the past prediction values and the past measurement values to the H-infinity filter;
   (c2) initializing variables of the H-infinity filter to obtain an initialized H-infinity filter;
   (c3) estimating a filter gain $H_k$ of the initialized H-infinity filter, updating the output value $x_K$ by using the estimated filter gain, and obtaining an error covariance to perform a filtering process of the H-infinity filter; and
   (c4) performing sequentially a time series of processes to obtain the output value $x_K$ for the final time point which is an end of a window.

2. The prediction value correction method according to claim 1, wherein the prediction condition in the step (a) includes a date to be predicted, a prediction time, a time point, a filter order, and a window size.

3. The prediction value correction method according to claim 1, wherein the corrected future prediction value for a corresponding time point of each date is sequentially obtained by repeatedly performing the steps (c), (d), and (e) while incrementing a data corresponding to a window by one.

* * * * *